United States Patent [19]

Mantel

[11] 3,795,074

[45] Mar. 5, 1974

[54] NATURAL BAIT HOLDER

[76] Inventor: John F. Mantel, 2728B N. Fratney St., Milwaukee, Wis. 53212

[22] Filed: May 24, 1973

[21] Appl. No.: 363,688

[52] U.S. Cl.......................... 43/44.2, 43/37, 43/44.8
[51] Int. Cl............................................. A01k 83/06
[58] Field of Search ......... 43/44.2, 43.4, 44.8, 44.4, 43/44.6, 37, 42.04, 42.41

[56] References Cited
UNITED STATES PATENTS

| | | | |
|---|---|---|---|
| 1,152,698 | 9/1915 | Bonner | 43/44.8 |
| 2,603,026 | 7/1952 | Duty | 43/44.2 |
| 2,821,046 | 1/1958 | Fisk | 43/44.2 |
| 3,026,645 | 3/1962 | Burnett | 43/37 |
| 3,100,359 | 8/1963 | Laba | 43/44.6 X |
| 3,465,466 | 9/1969 | Showalter | 43/44.8 |

*Primary Examiner*—James H. Czerwonky
*Attorney, Agent, or Firm*—Arthur L. Morsell, Jr.

[57] ABSTRACT

A straight wire shank has an eye formed on one end for attachment to a fishing line and has a pointed, grooved guide member attached to the other end for pierceable insertion into a worm, such as a night crawler, minnow, or other natural bait, or certain types of simulated natural bait of soft material. A pair of bait-securing wires are slideably attached to the wire shank and slideably extend through the grooves in the grooved guide member. The ends of the bait-securing wires are hook-shaped to engage the interior of the bait and hold it in position, but are substantially confined in the guide member during insertion so as not to interfere with insertion into the bait. The grooved guide member has camming surfaces which engage the bait-securing wires and spread the hook-shaped ends of the wires apart in response to forces which would normally tend to strip the bait from the holder, thereby holding the bait more firmly in position in response to such bait stripping forces. The hook-shaped ends of the bait-securing wires may be barbed to catch fish or alternately a separate barbed hook may be attached to the shank adjacent to the bait-securing wires for catching fish.

10 Claims, 7 Drawing Figures

PATENTED MAR 5 1974 3,795,074
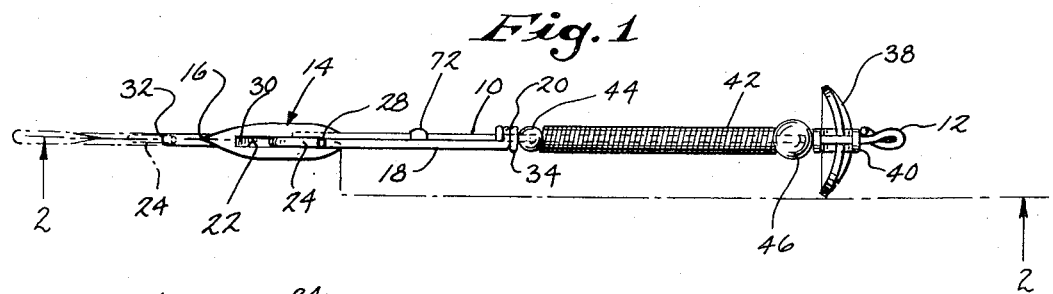
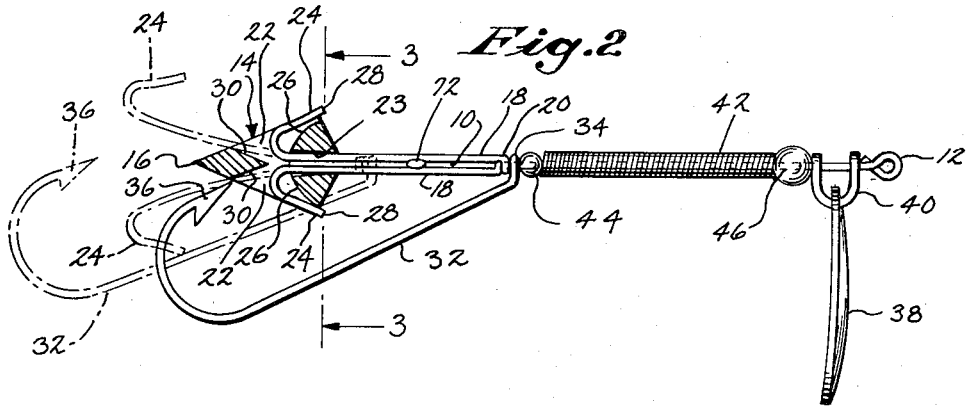
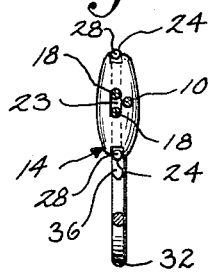
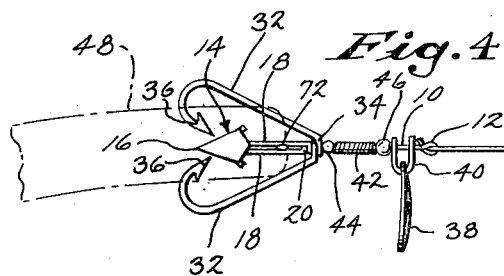
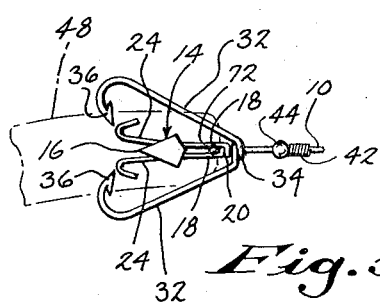
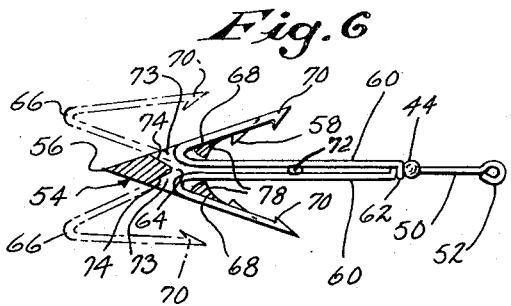
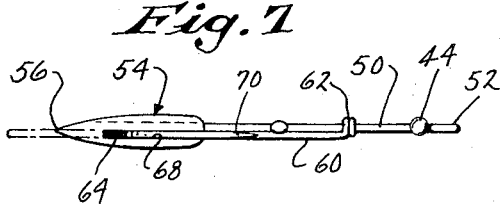

NATURAL BAIT HOLDER

BACKGROUND OF THE INVENTION

This invention relates to bait holder means for securing natural bait or certain types of simulated natural bait formed of rubber, plastic or other soft material to the end of a fishing line. In fishing with natural bait such as worms, minnows, insects, or the like on a bait casting rod, fly rod, or spinning rod, the bait is frequently stripped from the hook when it is cast, or when it is retrieved or trolled through weeds or over sunken branches or other obstacles. This requires that the bait be frequently replaced, which is annoying, inconvenient and expensive, and detracts from the pleasure of fishing. Moreover, the frequent replacement of bait may consume the entire supply of bait before the intended hour of departure and thus cause the fishing trip to be terminated early. The device is particularly adapted for use with night crawler worms.

SUMMARY OF THE INVENTION

The principal object of this invention is to provided a fishing bait holder which secures natural bait to the end of a line and holds it in position against bait stripping forces such as encountered in casting, jigging, trolling, or retrieving the bait through weeds or over sunken branches or other obstacles.

Another object of this invention is to provide a fishing bait holder which may be pierceably inserted endwise into the interior of natural bait where the bait-holding hooks are concealed and protected so that they will not catch on weeds or other obstructions.

A further object of this invention is to provide a fishing bait holder which tends to grip the bait more tightly when bait stripping forces are applied to the bait.

An additional object of this invention is to provide a fishing bait holder having bait-securing hooks which may be inserted into the interior of natural bait and which are barbed to also act as fish catching hooks.

Other objects and advantages of the invention will appear from the following description of one illustrative embodiment thereof.

In accordance with this invention, the foregoing objects are attained by providing apparatus including a straight wire shank having an eye on one end for attachment to a fishing line and having a grooved guide member attached to the other end which is shaped for pierceable insertion endwise into a worm, minnow, insect, or other natural bait, or certain types of soft simulated natural baits. A pair of bait-securing wires are slideably attached to the wire shank and slideably extend through the grooves in the grooved guide member. The ends of the bait-securing wires are hook-shaped to engage the interior of the bait and hold it in position. The grooved guide member has camming surfaces which engage the bait-securing wires and spread the hook-shaped ends of the wires apart in response to forces which would normally tend to strip the bait from the holder, thereby holding the bait more firmly in position in response to such bait stripping forces. The hook-shaped ends of the bait-securing wires may be barbed to catch fish and, in addition (or alternately), one or more separate barbed hooks may be attached to the shank adjacent to the bait-securing wires for catching fish. Weights, spinners, bucktails, rubber skirts, spoons, wobblers, propellers, feathers, additional hooks, or other artificial lures may be attached to the wire shank in front of the bait holder.

DECRIPTION OF THE DRAWINGS

FIG. 1 is an enlarged side view of one illustrative embodiment of the invention;

FIG. 2 is an enlarged plan view, partially in longitudinal section, taken on the line 2—2 of FIG. 1, the broken lines showing a second position of the parts;

FIG. 3 is a cross-sectional view taken on the line 3—3 of FIG. 2;

FIG. 4 is a plan view showing the grooved guide member pierceably inserted into one end of a worm and showing an optional auxiliary hook engaged externally with the worm;

FIG. 5 is a plan view similar to FIG. 4 showing the hook-shaped ends of the bait-securing wires spread apart within one end of the worm;

FIG. 6 is an enlarged plan view of another embodiment of the invention, the broken lines showing a second position of the hooks; and FIG. 7 is a side view of the embodiment shown in FIG. 6.

DESCRIPTION OF THE PREFERRED EMBODIMENTS

FIGS. 1, 2, and 3 disclose one illustrative embodiment of the invention which includes a straight wire shank 10 that has an eye 12 formed on one end for attachment to a fishing line and has a grooved guide member 14 attached to the other end thereof. Guide member 14 is pointed at end 16 so that it can be readily, pierceably inserted into one end of a worm, such as a night crawler, or other natural bait as shown in FIG. 4. A pair of bait-securing wires 18 have a common eye 20 which is slideable on the wire shank 10, portions of the wires 18 slideably extending through a hole 23 and in grooves 22 in guide member 14. The eye 20 of the bait-securing wires 18 is formed by wrapping the ends of wires 18 around the wire shank 10. The other end of each bait-securing wire 18 is bent to form a hook 24, preferably unbarbed as illustrated. These hooks are adapted to engage the interior of a natural bait to hold the bait in position. When the bait-securing wires 18 are slid to the right in FIGS. 1 and 2, the hooked ends 24 are substantially confined within the recesses 22 and abut against shoulders 26, with only their tip ends 28 projecting from the sides and end of guide member 14. The projecting tip ends 28 enable the hooked ends 24 to make initial engagement with the interior of the natural bait when guide member 14 is first inserted therein. Thus, when there is a pull on the bait, the hooked ends will be pulled with the bait, with the bait-securing wires 18 sliding to the left in FIGS. 1 and 2. During such sliding movement the wires 18 are acted on by a pair of diverging camming surfaces 30 which spread the hooked ends 24 of bait-securing wires 18 apart as indicated by the dashed lines. This camming or spreading of the hooked ends 24 is important because it tends to hold the bait more firmly in place when bait stripping forces are applied to the bait as will be explained hereinafter. There is a small amount of clearance when the hooks 24 are moved toward the left from the full line position of FIG. 2, before the hooks are acted on by the camming surfaces.

In this embodiment of the invention, the hooked ends 24 of bait-securing wires 18 are unbarbed and one or more barbed hooks 32 having an eye 34 at one end and a barb 36 at the other end may be slideably attached to wire shank 10 via eye 34. A spinner 38 may be rotatably attached to wire shank 10 via a U-shaped bracket 40 which is spaced from the bait-securing wires 18 by a helically-coiled wire spacer sleeve 42 and two bearing beads 44 and 46. The bead 44 is soldered to shank 10 to hold bait-securing hooks 32 in neutral position when piercing the bait with grooved guide member 14. The sleeve 42 also acts as non-slip member for pierceably inserting guide member 14 into a worm or the like. The shank 10 is arranged to slip through the eye 34 of hook 32. This action keeps the hook 32 free from bait stripping forces and therefore does not tug or tear on the bait until the hook is actually set. In use, when the small bait-holding hooks 24 reach their maximum opening position, the auxiliary fish catching hooks 32 will clear the guide member 14 and the hooks 24. The spinner 38 is not essential to the invention but is preferable in bait holders which are intended for use in fishing for bass or other game fish that are attracted by spinners.

The grooved guide member 14 is preferably made of metal such as lead or other relatively heavy material so as to serve the secondary function of acting as a concealed sinker for the bait. The sinker, holding hooks, catching hook point and barb are concealed in the bait, this being an important feature when fishing in heavily-fished waters where the fish are quite wary and might be scared away by exposed parts.

In using the embodiment of FIGS. 1, 2, and 3, the bait-securing wires 18 are first slid to the right in FIG. 2 until the hooked ends 24 are retracted into grooves 22 as shown by the solid lines in FIG. 2 with just the tip ends 28 sticking out. This can be done by either pushing on the hooked ends 24 of bait-securing wires 18 or by pulling on the wires 18. After the hooked ends 24 are retracted, the pointed guide member 14 is pierceably inserted into one end of a worm 48 or other natural bait as shown in FIG. 4. The end of the worm is then tugged slightly in the direction which tends to strip it from the guide member 14, and this causes the tip ends 28 to engage the interior of the worm and move the hooked ends 24 out of their grooves 22 as shown in FIG. 5. The barbed end 36 of hook 32 is then inserted into the worm as shown in FIG. 5 and the bait can then be used for fishing by any suitable method, e.g. still fishing, casting, jigging, or trolling.

During the process of fishing, if any bait stripping forces are applied to the worm 48, either by casting or by trolling or retrieval of the worm through weeds or other obstacles, these bait stripping forces tend to move the hooked ends 24 of the bait-securing wires 18 to the left in FIG. 5, which causes the camming surfaces 30 (see FIG. 2) to spread the hooked ends 24 still further apart and thus cause the worm 48 to be more firmly held in position. In addition, it should be noted that the bait holder of this invention is weedless by virtue of being contained within the interior of the worm 48 or other natural bait. The hook 32 is also weedless by virtue of having its barbed point 36 sunk into the interior of worm 48. Due to the bait-holding feature of hooked ends 24, the barbed points 36 of hooks 32 will not protrude through worm under normal casting, trolling and retrieving forces.

FIGS. 6 and 7 are enlarged views of another embodiment of the invention including a wire shank 50 which has an eye 52 formed at one end and a grooved guide member 54 attached to the other end thereof. Guide member 54 is pointed on end 56 to be pierceably inserted into natural bait and has barbed portions 58 formed at the other end. Barbed portions 58 are shaped to act as fish-catching barbs when the guide member 54 is inserted into the interior of a natural bait or certain types of simulated natural bait. A pair of bait-securing wires 60 are slideably secured at one end by eye 62 to wire shank 50 and are slideably engaged in a groove 64 in guide member 54. The bait-securing wires 60 are bent at 66 to form hooked ends which match the angle of the sides of guide member 54 and fit within grooves 68 therein. The ends of bait-securing wires 60 are barbed at 70 and extend beyond the barbed ends 58 of guide member 54 when the hooked ends 66 are retracted as indicated by the solid lines in FIG. 6. The bait-securing wires 60 can be slid to the left in FIGS. 6 and 7 until the eye 62 abuts against a stop bead 72 which is soldered on wire shank 50. As the bait-securing wires 60 are moved to the left, they are spread apart by diverging camming surfaces 74 on guide member 54 until they reach the position indicated by dashed lines in FIG. 6. There are recesses 73 located between the cam surfaces 74 and shoulders 78, as shown in FIG. 6, said recesses providing a small amount of clearance and the shoulders forming stops to limit movement of the hooks 66 toward the right, referring to FIG. 6.

No additional hook is needed in the embodiment of FIGS. 6 and 7 since the barbed hook ends 58 and 70 act as fish-catching hooks in addition to their function as bait-securing hooks.

In the use of this embodiment, the bait-securing wires 60 are first slid all the way to the right in FIG. 6 to put the barbed ends 70 in the position indicated by solid lines. The pointed end 56 of guide member 54 is then pierceably inserted into a worm or other natural bait. In this connection it should be noted that the dimensions shown in FIGS. 6 and 7 are considerably enlarged for clarity of illustration. The actual size of the guide member 54 is approximately the same as the guide member 14 in FIG. 5. In practice, the guide member 54 fits comfortably into the end of a worm or minnow or other natural bait, or certain types of simulated natural bait formed of rubber, plastic, or other soft material. As with the first embodiment, any bait stripping forces applied to the impaled bait tends to force the bait-securing wires 60 against camming surfaces 74, which spreads the hooked ends 66 of wires 60 farther apart to the broken line position of FIG. 6, and thus tends to hold the bait more securely in place. Also, as in the previous embodiment, the guide member 54 is made of metal or other heavy material to also function as a sinker. Weights, spinners, feathers, bucktails, spoons, wobblers, skirts, propellers, or other artificial lures could be added to this embodiment if desired.

The stop bead is permanently located in a predetermined position on the shank 10 at the time of manufacture. This position may vary depending upon the particular type of bait to be used, as the position of the stop 72 on the shank 10 determines the maximum spread of the hooks 24. The hooks 24, acting against any bait stripping forces, will spread until the eye 20 reaches the stop bead 72.

In the form of the invention of FIG. 6, when a fish strikes the bait, the force of setting the hook will cause the cam surfaces 74 to force the hook ends to the maximum open position, with the eye 62 contacting the bead 72. In the form of FIG. 6, the cam surfaces 74 will have a somewhat sharper angle than the form of the invention of FIG. 2 to provide for quicker spreading action of the hooks 66 with the barbs 70.

Various changes and modifications may be made without departing from the spirit of the invention, and all of such changes are contemplated as may come within the scope of the claims.

What I claim is:

1. A fishing bait holder comprising a straight wire shank having an eye formed on one end thereof and having a grooved guide member rigidly attached to the other end thereof, said grooved guide member being shaped to be readily pierceably inserted endwise into the interior of a soft fishing bait, a pair of bait-securing wires each having an eye at one end secured around said wire shank for sliding movement thereon, and having spaced portions slideably extending through the grooves formed on opposite sides of said grooved guide member, said bait-securing wires being hook-shaped on their opposite ends to engage the interior of said fishing bait and to hold the same in position, and said grooved guide member having cam surfaces engaged by said bait-securing wires to spread the latter apart as said hook-shaped ends are slid in a direction away from said grooved guide member, whereby forces acting on said bait in the direction to strip it from the holder cause the hook-shaped ends of said bait-securing wires to spread farther apart and thus to hold the bait more firmly in position.

2. A fishing bait holder as defined in claim 1 wherein said grooved guide member is pointed so as to be readily pierceably insertable into the interior of said bait.

3. A fishing bait holder as defined in claim 1 wherein said grooved guide member is made of relatively heavy material to serve as a sinker for said bait.

4. A fishing bait holder as defined in claim 1 wherein the eye for said bait-securing wires is formed by wrapping the wire around said wire shank.

5. A fishing bait holder as defined in claim 1 wherein the hook-shaped ends of said bait-securing wires are barbed at their ends to also act as fish catching hooks.

6. A fishing bait holder as defined in claim 1 wherein the hook-shaped ends of said bait-securing wires are unbarbed at their ends, and further comprising an external barbed fish catching hook attached to said wire shank adjacent to said bait-securing wires.

7. A fishing bait holder as defined in claim 1 and wherein said guide member has a hole through which portions of the bait-securing wires slide.

8. A fishing bait holder as defined in claim 1 and further comprising a stop bead attached to said wire shank for abutting against the eye of said bait-securing wires to limit the movement of the same.

9. A fishing bait holder as defined in claim 1 wherein the movement of said bait-securing wires is limited in one direction by abutment of said hook-shaped ends thereof against an adjacent shoulder on said grooved guide member.

10. A fishing bait holder as defined in claim 1 wherein the hook-shaped ends of said bait-securing wires have tips projecting from the sides of said grooved guide member in all positions of said bait-securing wires.

* * * * *

UNITED STATES PATENT OFFICE
CERTIFICATE OF CORRECTION

Patent No. 3,795,074    Dated March 5, 1974

Inventor(s) John F. Mantel

It is certified that error appears in the above-identified patent and that said Letters Patent are hereby corrected as shown below:

Column 5, line 16, ancel "each"; same line "cancel "an"; same line 16, after "eye" insert -- means --.

Signed and sealed this 29th day of October 1974.

(SEAL)
Attest:

McCOY M. GIBSON JR.    C. MARSHALL DANN
Attesting Officer        Commissioner of Patents